April 14, 1970     C. O. BERRYMAN     3,506,281

VEHICLE SAFETY APPARATUS

Filed Oct. 6, 1967     2 Sheets-Sheet 1

INVENTOR.
CHARLES O. BERRYMAN
BY
*Yound, Raney, Flynn and Tarolli*
ATTORNEYS

April 14, 1970 C. O. BERRYMAN 3,506,281
VEHICLE SAFETY APPARATUS
Filed Oct. 6, 1967 2 Sheets-Sheet 2
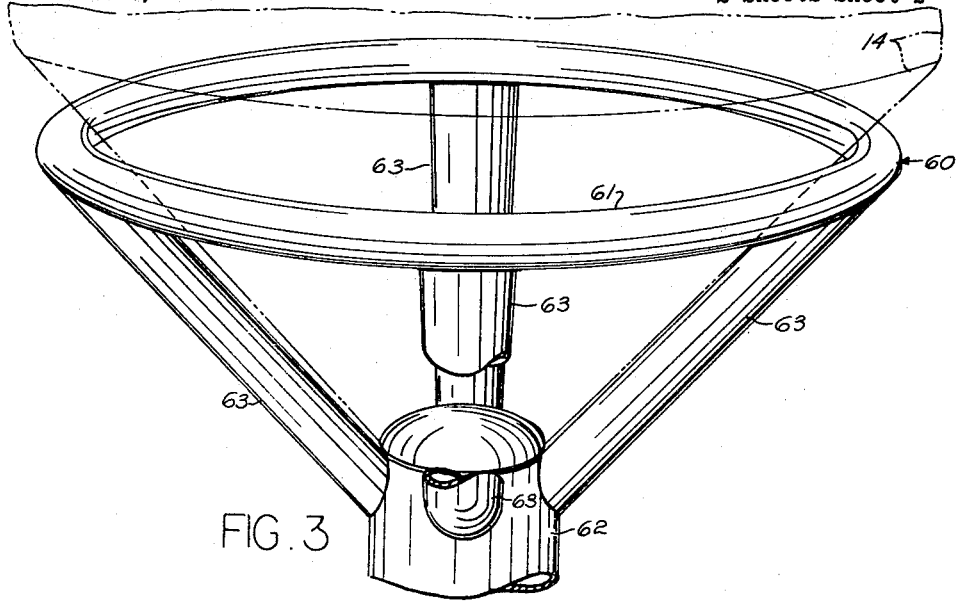
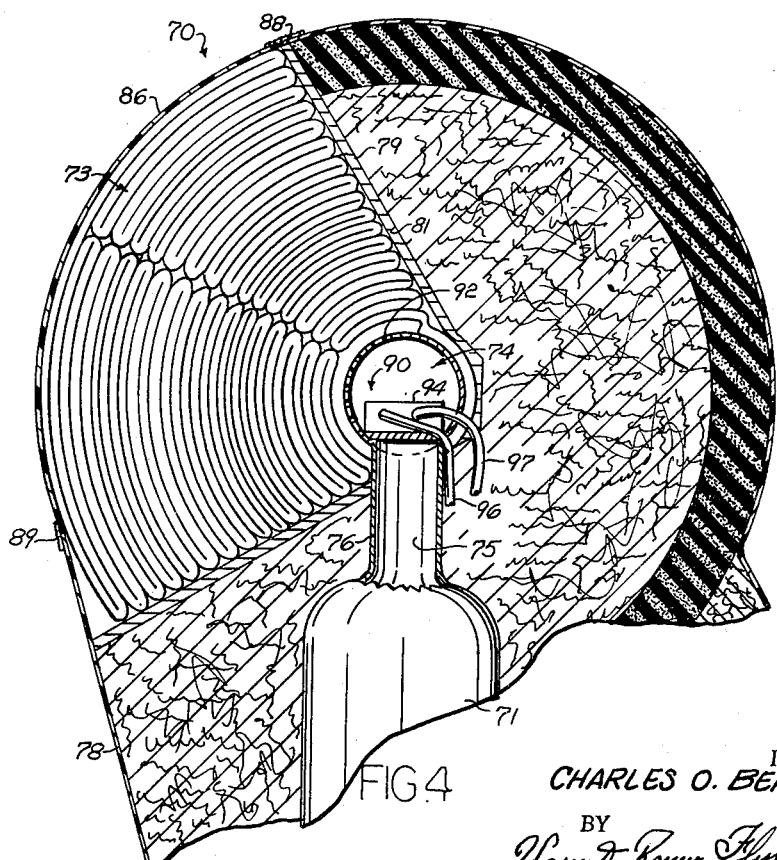
INVENTOR.
CHARLES O. BERRYMAN
BY
ATTORNEYS

United States Patent Office 3,506,281
Patented Apr. 14, 1970

3,506,281
VEHICLE SAFETY APPARATUS
Charles O. Berryman, Madison, Wis., assignor to Eaton Yale & Towne Inc., Cleveland, Ohio, a corporation of Ohio
Filed Oct. 6, 1967, Ser. No. 677,470
Int. Cl. B60r 21/00
U.S. Cl. 280—150                                10 Claims

ABSTRACT OF THE DISCLOSURE

A safety apparatus operates to protect an occupant or occupants of a vehicle during a collision. The safety apparatus comprises an inflatable confinement and a reservoir containing a supply of fluid for inflating the confinement in response to a collision condition. The reservoir is of a tubular construction and also comprises a load carrying part of the vehicle, such as the steering wheel or seat support frame.

---

The present invention relates to vehicle safety apparatus, and more particularly to vehicle safety apparatus including an inflatable confinement for protecting an occupant or occupants of the vehicle during a collision and a fluid reservoir containing a supply of fluid under pressure for inflating the confinement.

An important object of the present invention is the provision of a new and improved vehicle safety apparatus of the character referred to above, and in which the fluid reservoir also comprises a load carrying or force transmitting member forming a part of the vehicle.

Another object of the present invention is the provision of a new and improved vehicle safety apparatus of the character referred to above, and in which the fluid reservoir comprises a hollow or tubular portion of a steering wheel for steering the vehicle.

A further object of the present invention is the provision of a new and improved vehicle safety apparatus wherein the vehicle steering wheel includes a spirally extending tubular portion which contains a supply of pressurized fluid and which portion is yieldable to absorb the energy of the driver when the latter is impacted thereagainst.

Yet another object of the present invention is the provision of a new and improved vehicle safety apparatus of the character referred to above, and in which the supply of pressurized fluid is contained in a hollow or tubular portion comprising part of a seat frame for one of the seats of the vehicle.

Another object of the present invention is the provision of a new and improved vehicle safety apparatus which comprises an inflatable confinement associated with the steering wheel of the vehicle and which is inflated by fluid flow from a fluid reservoir, and wherein a fluid diffuser member is carried by the steering column of the vehicle and is located in the flow of fluid from the fluid reservoir to the confinement.

The present invention also resides in certain novel constructions and arrangements of parts, and further objects and advantages of the present invention will be apparent to those skilled in the art from the following detailed description of the illustrated embodiments thereof described with reference to the accompanying drawing, which forms a part of this specification and in which:

FIG. 3 is a fragmentary elevational view with parts shown in section of an alternate embodiment of the safety apparatus of the present invention; and FIG. 4 is an enlarged sectional view of part of the safety apparatus shown in FIG. 1.

The novel safety apparatus of the present invention can be employed in various types of vehicles, but is particularly susceptible for use in automobiles, trucks, and airplanes, and for the purposes of illustration is herein shown and described as embodied in an automobile 10.

Figure 1:
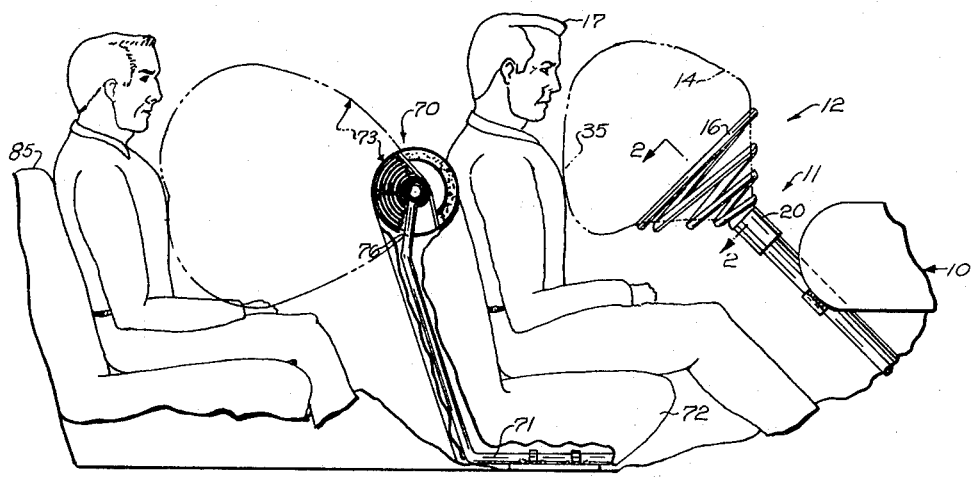
FIG. 1 is a fragmentary side elevational view of an automobile with parts shown in section embodying the novel safety apparatus of the present invention.
Figure 2:
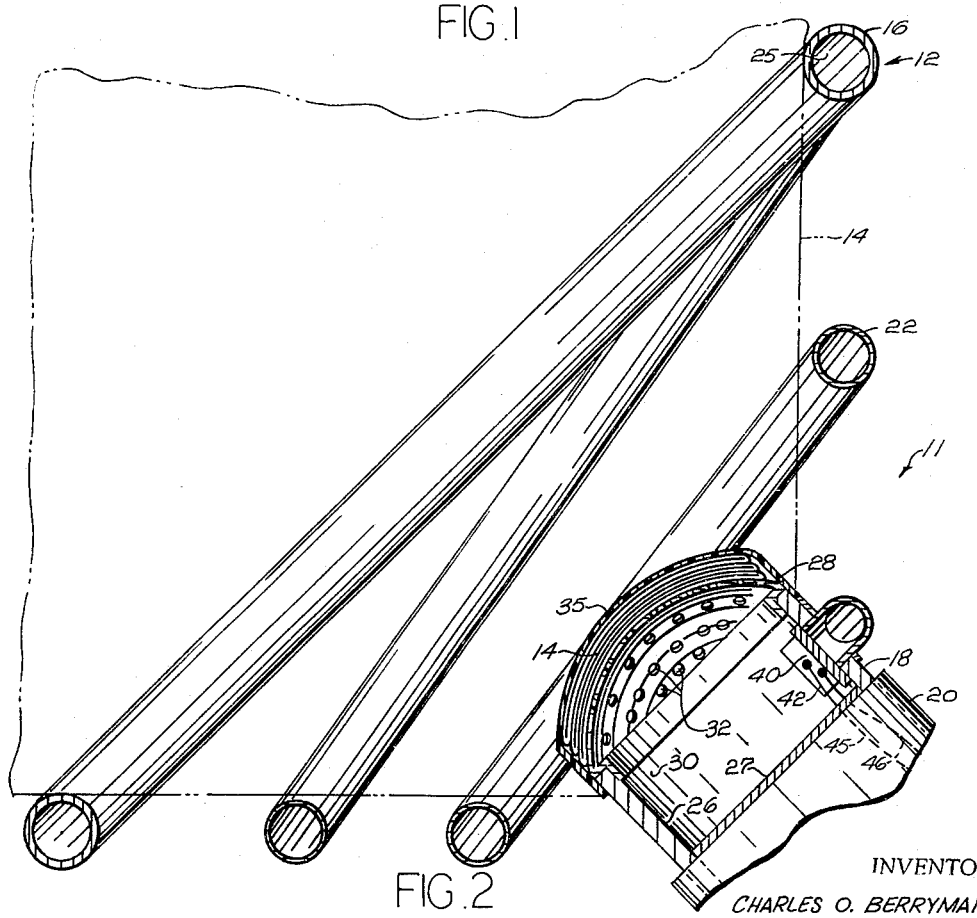
FIG. 2 is an enlarged fragmentary sectional view taken approximately along line 2—2 of FIG. 1.

As representing one embodiment of the present invention, FIGS. 1 and 2 of the drawing illustrate a safety apparatus comprising a safety device 11. The safety device 11 comprises, in general, a vehicle steering wheel 12 for containing a supply of pressurized fluid, an inflatable confinement 14 which is adapted to be inflated by the pressurized fluid when the latter is released, and an actuating means 15 for releasing the pressurized fluid to inflate the inflatable confinement in response to a collision condition.

The steering wheel 12, as best shown in FIG. 2, comprises an outer, annular hollow or tubular wheel portion 16 which is adapted to be manually grasped by an operator 17 of the automobile 10, a hub portion 18 which is adapted to be mounted on the steering column 20 of the automobile 10 and a spirally extending intermediate portion 22 of tubular construction. The intermediate portion 22 has one end suitably secured to the outer wheel portion 16 and the other end suitably secured to the hub portion 18. The outer wheel portion 16 and the intermediate tubular portion 22 are in communication with each other and, since they are of a tubular construction, their internal surfaces define a reservoir 25 for containing the supply of pressurized fluid.

The hub portion 18 of the steering wheel 12 is adapted to be mounted on and carried by the steering column 20 in any suitable or conventional manner. The hub portion 18 comprises an annular side wall 26 and end walls 27 and 28 which define a fluid diffusion chamber 30. The end wall 28 comprises a diffuser member and is arcuate or generally semispherical in shape and has a plurality of apertures 32 therein which place the chamber 30 in communication with the interior of the inflatable confinement 14. The apertures 32 function to dispense or spread the fluid as the fluid flows from the chamber 30.

The inflatable confinement 14 is suitably secured to the annular side wall 26 of the hub portion 18 and in surrounding relationship with the end wall 28. The confinement 14 is normally disposed in a collapsed or folded condition, as shown by the solid lines in FIG. 2, and is adapted to be inflated to protect the operator of the automobile when the pressurized fluid in the reservoir 25 is released. The inflatable confinement 14 has a portion 35 thereof which moves outwardly from the hub of the steering wheel 12 and relative to the operator 17 while being inflated and when inflated assumes the phantom line position shown in FIG. 1. The confinement 14 when inflated provides a cushion or restraint against which the operator 17 moves as a result of the collision and which restrains the movement of the operator to prevent a forcible impact with a structural part of the vehicle.

The pressurized fluid in the reservoir 25 is adapted to be released therefrom and flow into the diffusion chamber 30 in response to the vehicle encountering a collision condition. To this end, the intermediate tubular portion 22 at its inner or lower end, as viewed in FIG. 2, is connected to the annular side wall 26 of the hub portion 18 and in any suitable manner, such as by welding. Communication between the inner end of the tubular portion 22 and the diffusion chamber 30 is normally sealed by a sealing means 40. The sealing means 40 may comprise a diaphragm member which blocks communication between the reservoir 25 and the chamber 30. An explosive charge 42 is associated with the diaphragm member 40 and when ignited causes the reservoir 25 to be communicated with the chamber 30. The explosive charge 42 is suitably connected to a pair of lead wires 45, 46 and is adapted to be exploded when a current is passed through the lead wires 45, 46.

The explosive charge 42 is adapted to be exploded in response to a collision condition occurring. To this end, a suitable or conventional collision sensing device, not shown, is provided. The sensing device may be connected in series with an energy source on the automobile 10 and with the lead wires 45, 46 so that when the sensing device responds to a collision condition occurring, a circuit is completed to ignite the explosive charge 42.

From the foregoing, it should be apparent that when a collision condition is occurring the explosive charge 42 is exploded to effect opening of the pressurized fluid in the reservoir 25. The pressurized fluid from the reservoir 25 flows into the diffusion chamber 30 and passes or flows through the apertures 32 in the wall 28 to the interior of the inflatable confinement 14. As the fluid flows into the inflatable confinement, the portion 35 of the confinement moves outwardly of the steering column 20 and toward the occupant of the vehicle until it assumes the inflated or expanded position, as shown by the phantom lines in FIG. 1.

The novel safety apparatus of the present invention, as is apparent from the above, includes a single part for performing two functions. That is, a novel steering wheel is provided for both steering the automobile 10, and in a normal manner, and for providing the reservoir 25 for storing the pressurized fluid. This provides for an economy of manufacture, since the need for a separate reservoir for containing the pressurized fluid is eliminated.

Another feature of the novel safety apparatus is that the steering wheel construction 12, as best shown in FIG. 2, also serves as an energy absorbing means for absorbing the energy of the operator if the latter impacts against the outer wheel portion 16 thereof. The provision of a spirally wound portion 22 provides a yieldable means for cushioning the impact of the occupant upon the latter engaging the outer wheel portion 16, since it enables the outer wheel portion 16 to move downwardly toward the steering column. The spirally wound tubular portion thus, in effect, acts like a spring to cushion and absorb the impact forces of the occupant thereagainst.

FIG. 3 illustrates a modified form of steering wheel 60 which may be used in place of the steering wheel 12 shown in FIG. 1. The steering wheel 60 functions in the same manner as steering wheel 12 except that in the wheel 60 no energy absorbing means for absorbing the energy of the operator upon the latter impacting thereagainst is provided. The steering wheel 60 comprises an outer tubular wheel portion 61, a hub portion 62, and a plurality of radially extending portions 63 having one end connected to the hub portion 62 and the other end with the outer wheel portion 61. The hub portion 62 is of identical construction to the hub portion 18 and, therefore, will not be described in detail.

The outer tubular wheel portion 61 and radially extending tubular portions 63 are in communication with each other and define a reservoir for containing a supply of pressurized fluid which is adapted to be released into the diffusion chamber of the hub portion 62 to inflate the confinement, in the same manner as previously described in connection with the steering wheel 12 of FIG. 1.

As representing another embodiment of the novel safety apparatus of the present invention, FIGS. 1 and 4 of the drawing show a safety apparatus comprising a safety device 70. The safety device 70 comprises, in general, a seat frame 71 for supporting the front seat 72 of the automobile and for containing a supply of pressurized fluid, and inflatable confinements 73 which is adapted to be inflated by the pressurized fluid when the latter is released, and an actuating means 74 for releasing the pressurized fluid to inflate the inflatable confinement in response to a collision condition.

The seat frame 71 is of a hollow or tubular construction and has substantially the same over-all shape or configuration as a standard or conventional seat frame. The internal surfaces of the tubular seat frame 71 define a reservoir 75 for containing a supply of pressurized fluid. The seat frame 71 includes an upwardly extending tubular portion 76 which is in communication with a cylindrical diffuser tube 77 extending lengthwise across the back side 78 of the front seat 72 and which is suitably carried by a bracket 79, which in turn is mounted to the front seat 72. Preferably, the back side 78 of the front seat 72 is provided with a cavity 81 and the diffuser tube 77 and bracket 79 are disposed within the cavity 81 when mounted to the front seat 72.

The inflatable confinement 73 is normally disposed in a collapsed or folded condition, as shown in FIG. 4, and is adapted to be inflated to the phantom line position shown in FIG. 1 to protect the occupant or occupants sitting in the back seat 85 of the automobile when the pressurized fluid within the reservoir 75 is released. The front seat 72 is preferably provided with a suitable piece of fabric or other material 86 which is the same as the seat and which overlies the confinement 73 when in its folded position. The piece of fabric 86 is preferably secured to the front seat by a pair of longitudinally extending strips of tape 88, 89, which are adapted to be torn to allow the piece of fabric 86 to detach from the front seat 72 when the confinement 73 is inflated.

A sealing means 90 secured to the diffuser tube 77 at its juncture with the tubular portion 76 is provided for normally blocking communication between the diffuser tube 77 and the reservoir 75. Attached to the sealing means 90 is an explosive charge 94. The explosive charge 94 is designed to rupture the sealing means 90 upon being ignited to allow the fluid in the reservoir portion of the seat frame 71 to enter the diffuser tube 77 and then flow through a plurality of openings 92 in the diffuser tube 77 into the interior of the confinement 73.

The explosive charge 94 is adapted to be actuated in response to a colllision condition occurring. To this end, a suitable or conventional collision sensing device is provided which completes an electric circuit to explode the charge 94, as noted above in connection with charge 40.

From the foregoing, it should be apparent when a collision condition occurs, the explosive charge 94 is exploded to rupture the sealing means 90 to enable the pressurized fluid in the reservoir 75 to flow into the diffuser tube 77. The pressurized fluid from the diffuser tube 77 passes or flows through the apertures 92 therein and into the interior of the inflatable confinement 73. As the fluid flows into the inflatable confinement 73, a portion of the confinement moves outwardly toward the back seat of the automobile 10 to restrain the occupant sitting in the back seat against movement.

From the foregoing, it should be apparent that the hereinbefore enumerated objects and others have been accomplished and that there is provided a new and improved vehicle safety apparatus. It should also be apparent from the above that the present invention has been described in considerable detail and that certain modifications, changes, and adaptations may be made therein by those skilled in the art.

What is claimed:

1. Vehicle safety apparatus comprising inflatable confinement means having a collapsed condition and which is adapted to be inflated to restrain movement of an occupant of the vehicle during a collision, a steering wheel including a rotatable conduit portion thereof, said rotatable conduit portion being adapted to be manually grasped by the driver of the vehicle and rotated to vary the direction of movement of the vehicle, said rotatable conduit portion being substantially tubular in configuration and containing a supply of pressurized fluid therein, said conduit portion being in communication with the interior of said confinement means, and means for releasing said pressurized fluid from said conduit portion to said confinement means to inflate said confinement means.

2. Vehicle safety apparatus as defined in claim 1 wherein said steering wheel includes a hub portion, said confinement means being secured to said hub portion, and said confinement means having a surface portion which is movable outwardly from the hub portion to a position adjacent the occupant to restrain movement of the occupant when inflated.

3. Vehicle safety apparatus as defined in claim 2 wherein said steering wheel further includes energy absorbing means for absorbing impact forces of the occupant if the latter impacts against said steering wheel.

4. Vehicle safety apparatus as defined in claim 1 wherein said steering wheel includes a hub portion which is adapted to be mounted on a steering column of the vehicle, said hub portion having a chamber therein disposed in communication with said reservoir, and a diffuser member in communication with the interior of said confinement means.

5. Vehicle safety apparatus adapted to be associated with a steering column of a vehicle and comprising fluid actuated means operatively connected with said steering column and adapted to restrain an occupant of the vehicle during an accident, a steering wheel including a rotatable conduit portion, said rotatable conduit portion being adapted to be manually grasped by an occupant of the vehicle and rotated to vary the direction of movement of the vehicle, said rotatable conduit portion being substantially tubular in configuration and defining a fluid reservoir for containing a supply of fluid for operating said fluid actuated means therein, means providing for fluid flow between said reservoir and said fluid actuated means, and a fluid diffuser member carried by said steering column and located in said fluid flow and operable to spread said fluid flow prior to said flow operating said fluid actuated means.

6. Vehicle safety apparatus as defined in claim 5 wherein said fluid actuated means comprises an inflatable confinement which operates when inflated to restrain movement of an occupant of the vehicle relative to the vehicle.

7. Vehicle safety apparatus comprising inflatable confinement means normally disposed in a collapsed condition and which is adapted to be inflated to restrain movement of an occupant of the vehicle during a collision, a steering wheel for steering the vehicle and wherein at least a portion of said steering wheel is hollow to define a fluid reservoir for containing pressurized fluid therein and which is in communication with the interior of said confinement means, said steering wheel including an annular member which is adapted to be grasped by the occupant and a spirally extending tubular portion operatively connected adjacent one end portion with said annular member and adjacent the other end portion with a steering column of the vehicle, said spirally extending member containing a supply of pressurized fluid and being yieldable to absorb the energy of the occupant if the latter impacts against said steering wheel, and means for releasing pressurized fluid from said reservoir for flow to the interior of said confinement means to inflate said confinement means.

8. Vehicle safety apparatus comprising an inflatable confinement having a normally collapsed condition and an expanded condition for restraining movement of an occupant of the vehicle during a collision, a steering wheel for steering the vehicle, said steering wheel including tubular conduit means at least a portion of which is adapted to be grasped by the occupant of the vehicle to effect steering of the vehicle, said conduit means defining a reservoir for storing a pressurized fluid therein, and means for releasing the pressurized fluid from said reservoir for flow to the interior of said confinement to expand said confinement.

9. Vehicle safety apparatus as defined in claim 8 wherein said steering wheel includes a hub portion which is adapted to be mounted on a steering column of the vehicle, said hub portion having a chamber therein in communication with said reservoir and a perforated diffuser member adjacent one end portion of the chamber with said confinement means being secured to said hub portion and in surrounding relationship with said diffuser member.

10. Vehicle safety apparatus as defined in claim 8 wherein said steering wheel further includes energy absorbing means for absorbing impact forces if the occupant impacts against said steering wheel.

References Cited

UNITED STATES PATENTS

| 1,493,736 | 5/1924 | Collins | 280—106 |
|---|---|---|---|
| 2,899,214 | 8/1959 | D'Antini | 280—87 |
| 2,963,919 | 12/1960 | Larsen | 74—494 |
| 3,396,983 | 8/1968 | Massey et al. | 280—5 |

FOREIGN PATENTS 1,028,225  5/1953  France.

KENNETH H. BETTS, Primary Examiner

U.S. Cl. X.R.

74—492